United States Patent
Huang

(10) Patent No.: US 10,453,113 B2
(45) Date of Patent: Oct. 22, 2019

(54) REORDER POINT MANAGEMENT IN A SMARTPHONE

(71) Applicant: SugarCRM Inc., Cupertino, CA (US)

(72) Inventor: Paul Huang, Sunnyvale, CA (US)

(73) Assignee: SUGARCRM INC., Cupertino, CA (US)

( * ) Notice: Subject to any disclaimer, the term of this patent is extended or adjusted under 35 U.S.C. 154(b) by 57 days.

(21) Appl. No.: 14/686,473

(22) Filed: Apr. 14, 2015

(65) Prior Publication Data

US 2016/0307257 A1   Oct. 20, 2016

(51) Int. Cl.
*G06Q 30/06* (2012.01)

(52) U.S. Cl.
CPC ..... *G06Q 30/0635* (2013.01); *G06Q 30/0613* (2013.01)

(58) Field of Classification Search
CPC ........... G06Q 30/0255; G06Q 30/0631; G06Q 20/3221; G06Q 30/0601–0645; G06Q 20/40; G06Q 30/06–08
USPC .............................................. 705/26.1–27.2
See application file for complete search history.

(56) References Cited

U.S. PATENT DOCUMENTS

| | | | |
|---|---|---|---|
| 2007/0150369 A1* | 6/2007 | Zivin ................... | G06Q 30/02 705/26.64 |
| 2013/0173419 A1* | 7/2013 | Farber ................ | G06Q 30/0631 705/26.7 |
| 2013/0332301 A1* | 12/2013 | Kilroy ................... | G06Q 30/06 705/26.4 |
| 2014/0279204 A1* | 9/2014 | Roketenetz ........ | G06Q 30/0631 705/26.7 |
| 2014/0279208 A1* | 9/2014 | Nickitas ............. | G06Q 30/0631 705/26.7 |
| 2016/0162973 A1* | 6/2016 | Lee .................... | G06Q 30/0631 705/26.7 |

OTHER PUBLICATIONS

How to set a low inventory alert in Excel, Nov. 2, 2013, available at https://www.youtube.com/watch?v=34UR4ELmeRg. (Year: 2013).*

* cited by examiner

*Primary Examiner* — Ming Shui
(74) *Attorney, Agent, or Firm* — Steven M. Greenberg, Esq.; Shutts & Bowen LLP

(57) ABSTRACT

Embodiments of the present invention provide a method, system and computer program product for reorder point management in a smartphone. In an embodiment of the invention, a method for purchase reminding includes monitoring payments performed by a payment application executing in memory of a smartphone and determining by a processor of the smartphone for each of the payments, an ordered product. The method further includes associating each ordered product for which payment has been made with a corresponding reorder point indicating a lapse of time subsequent to which the ordered product is to be reordered. Finally, the method includes periodically processing each reorder point to determine whether or not to reorder a corresponding ordered product and, in response to the processing, displaying in the smartphone a reminder to reorder each ordered product for which a corresponding reorder point indicates reordering.

12 Claims, 1 Drawing Sheet

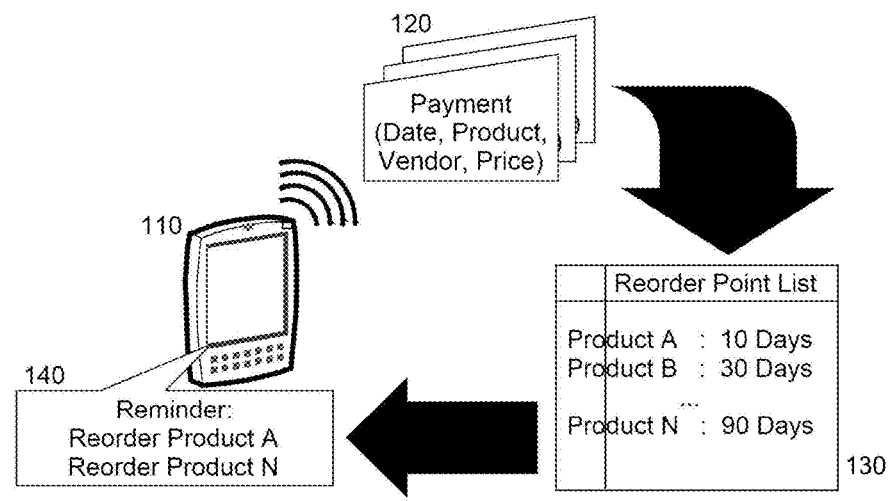
FIG. 1
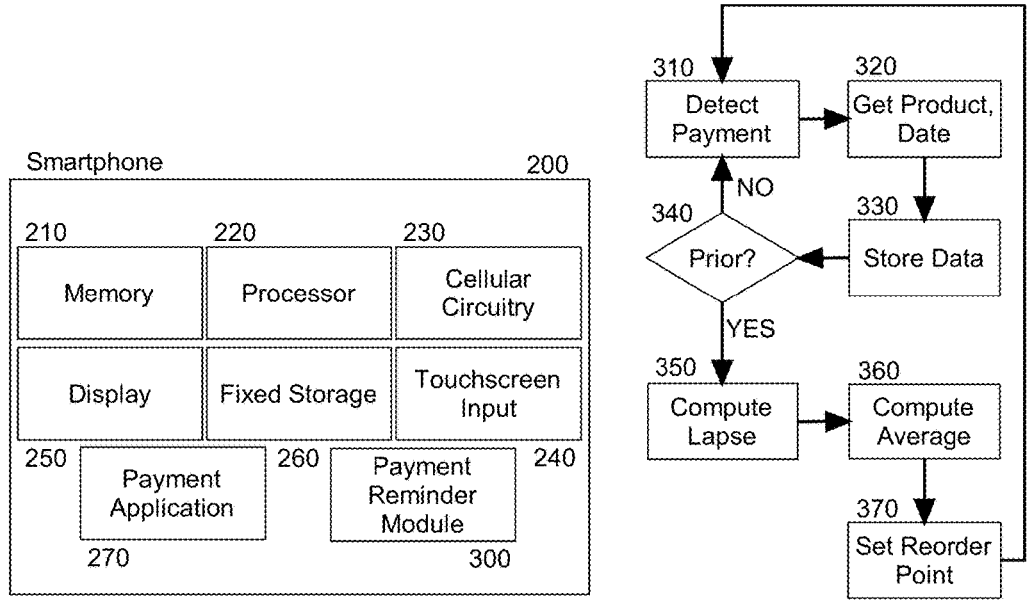
FIG. 2
FIG. 3

REORDER POINT MANAGEMENT IN A SMARTPHONE

BACKGROUND OF THE INVENTION

Field of the Invention

The present invention relates to inventory management and more particularly to retail management of re-order points in a smartphone.

Description of the Related Art

Inventory management refers to the determination of a requisite level of inventory to maintain in a business organization so as to achieve the business goals of the organization such as a manufacturing goal or a sales goal. Traditional inventory management begins with simple record keeping recording a number of units of each product in inventory, a cost of acquiring the units and a time period during which the units have remained in inventory. More advanced inventory management includes an indication of a location in a physical space in which the units are stored. Elemental to any inventory management scheme is the determination of when a supply of units of inventory are likely to become exhausted so as to require the re-ordering of additional units to avoid a condition where the required number of units of inventory are not present in inventory. This determination is known as a reorder point.

The reorder point more specifically is the level of inventory that triggers an action to replenish particular inventory stock. The reorder point normally is calculated as the forecast usage of inventory stock during a period of time associated with the lead time to replenish the inventory stock in addition to the requirement of a certain presence of "safety stock". Assuming that there is no time lag between the ordering and the procuring of required inventory stock, the reorder point for replenishing inventory stock occurs at a level when the level of inventory stock drops to zero. Therefore, a reorder point is a technique to determine when to order—not how much to order.

Plainly, the notion of a reorder point is limited to inventory management in a commercial setting. However, as a practical matter, reorder points exist in the daily lives of private citizens. To wit, every household inherently is aware of a point in time when a replenishment of groceries is required—especially in the case of perishables such as milk or eggs. Even in connection with non-perishable goods such as light bulbs, garbage bags, gasoline or laundry detergent, most households innately known when it is time to seek a replenishment of a product. Yet, while the individual can trust one's instincts to simply known when to reorder product in respect to core goods, for some products, it is less clear when it is time to order more.

Internet retailers recognize the ease in which consumers often fail to recognize a reorder point for personal items. To address this problem, many Internet retailers maintain records of the purchasing patterns of individual customers and push e-mail notices to those customers when it is determined that "it is time" for the customers to reorder product. Common examples include purveyors of water filters for one's refrigerator, or air filters for one's car. Even automotive dealers, dentists and veterinarians push messages to their respective customers when the records of these different vendors indicate a reorder point for the customers. However, in all such circumstances, the customer benefits from the reorder point management of the vendor only in respect to the product or service offered by the particular vendor.

BRIEF SUMMARY OF THE INVENTION

Embodiments of the present invention address deficiencies of the art in respect to consumer focused reorder point management and provide a novel and non-obvious method, system and computer program product for reorder point management in a smartphone. In an embodiment of the invention, a method for purchase reminding includes monitoring payments performed by a payment application executing in memory of a smartphone and determining by a processor of the smartphone for each of the payments, an ordered product. The method further includes associating each ordered product for which payment has been made with a corresponding reorder point indicating a lapse of time subsequent to which the ordered product is to be reordered. Finally, the method includes periodically processing each reorder point to determine whether or not to reorder a corresponding ordered product and, in response to the processing, displaying in the smartphone a reminder to reorder each ordered product for which a corresponding reorder point indicates reordering.

In one aspect of the embodiment, the reorder point for each ordered product is computed based upon a lapse in time between monitored payments for the ordered product. Optionally, the lapse in time between monitored payments is an average of all lapses of time between monitored payments for the ordered product over a pre-determined period of time. In another aspect of the embodiment, each ordered product is classified according to type and the reorder point is determined for an ordered product based upon a pre-determined reorder point for a type of the ordered product. In even yet another aspect of the embodiment, a vendor is determined for each payment and the reminder includes a list, for each ordered product requiring reordering, of vendors from which the ordered product had previously been ordered. Alternatively, a purchase price is determined for each payment and the reminder includes a list, for each ordered product requiring reordering, of all prices previously paid for the ordered product.

In another embodiment of the invention, a smartphone embedded data processing system is configured for purchase reminding. The system includes a smartphone that has at least one processor, fixed storage, a display, touchscreen input, cellular communications circuitry, and memory. The system also includes a payment processing application disposed in the fixed storage and processing payments for different ordered products. Finally, the system includes a purchase reminding module coupled to the payment processing application and executing in the memory of the smartphone. The module includes program code enabled to monitor the payments, to determine for each of the payments, an ordered product, to associate each ordered product for which payment has been made with a corresponding reorder point indicating a lapse of time subsequent to which the ordered product is to be reordered and to periodically process each reorder point to determine whether or not to reorder a corresponding ordered product and, in response to the processing, to display in the display a reminder to reorder each ordered product for which a corresponding reorder point indicates reordering.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for reorder point management in a smartphone;

FIG. 2 is a schematic illustration of a smart phone data processing system configured for reorder point management; and, FIG. 3 is a flow chart illustrating a process for reorder point management in a smartphone.

DETAILED DESCRIPTION OF THE INVENTION

Embodiments of the invention provide for reorder point management in a smartphone. In accordance with an embodiment of the invention, payments processed in a smartphone can be monitored by logic embedded in the smartphone. A date and product type can be recorded in connection with each product purchased in association with a corresponding payment. Thereafter, a reordering pattern can be computed for each of purchased product including a frequency in which each product is purchased using the smartphone. Based upon the reordering pattern, for each product having a reordering pattern, a notification can be provided in the smartphone prompting to reorder the product when a period of time consistent with the determined frequency for the product has elapsed. Optionally, a link can be presented in the notification responsive to the selection of which a form can be rendered in the smartphone necessary to purchase the product to be reordered. In this way, the smartphone can manage reorder points for products purchased using the smartphone.

In further illustration, FIG. 1 pictorially shows a process for reorder point management in a smartphone. As shown in FIG. 1, the payments 120 generated by a payment application of a smartphone 110 are monitored so as to determine for each payment, a product ordered, a date on which the product is ordered, a vendor from which the product is ordered and a price paid for the product. Based upon each payment, a reorder point can be computed by the smartphone 110 and stored in a list of reorder points 130 for multiple different products. In this regard, the reorder point for each of the products can be computed as a lapse of time between orders for the same product, or as an average of lapses of time between multiple different orders for the same product, or as a pre-determined value for a type of the product.

Thereafter, periodically the list of reorder points 130 is processed to determine, for each previously ordered product, if a threshold period of time has elapsed since a last order that exceeds a reorder point computed for the product. In response to the processing, a reminder 140 is displayed in the smartphone 140 listing all products previously ordered that are due for reordering based upon corresponding reorder points included in the list of reorder points 130. Optionally, for each previously ordered product in the reminder 140, a list of vendors from which the previously ordered product had been previously ordered can be displayed, as well as a previous price paid for the previously ordered product.

The process described in connection with FIG. 1 can be implemented in a smartphone. In yet further illustration, FIG. 2 schematically illustrates a smart phone data processing system configured for reorder point management. The system includes a smartphone 200 that includes each of memory 210, one or more processors 220, cellular circuitry 230, a display 250, fixed storage 260 and touchscreen input device 240. A payment application 270 executes in the memory 210 of the smartphone 200 and provides a mechanism for submitting payments for products over the global Internet by way of a cellular communications network.

Notably, a payment reminder module 300 is coupled to the payment application 270. The payment reminder module 300 includes program code that executes in the memory 210 of the smartphone 200 by the processor 220. The program code is enabled upon execution in the memory 210 to monitor payments processed in the payment application 270, to determine for each of the payments, an ordered product, to associate each ordered product for which payment has been made with a corresponding reorder point indicating a lapse of time subsequent to which the ordered product is to be reordered and to periodically process each reorder point to determine whether or not to reorder a corresponding ordered product and, in response to the processing, to display in the display 250 a reminder to reorder each ordered product for which a corresponding reorder point indicates reordering.

In even yet further illustration of the operation of the payment reminder module 300, FIG. 3 is a flow chart illustrating a process for reorder point management in a smartphone. Beginning in block 310, a payment can be detected in a coupled payment application. In block 320, a date of the payment is determined along with a product associated with the payment. In block 330, the date of the payment and the product associated with the payment is stored in memory of the smartphone. In decision block 340, it can be determined if a prior payment has been stored in the memory in connection with the product.

If so, in block 350, a lapse of time between the dates of both payments is computed. Optionally, in block 360 an average of all lapses of time for payments for the product over a period of time is computed. Thereafter, in block 370 a reorder point is established for the product based upon the computed lapse of time or the average of lapses of time for the product, whichever the case may be. In this way, a reorder point for each previously ordered product can be programmatically determined continuously so as to autonomically remind an end user of a smartphone when to reorder multiple different products previously ordered by the end user.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for purchase reminding comprising:
   monitoring by a payment reminder module of a smartphone, payments processed by the smartphone to different vendors for different products in a plurality of different applications of the smartphone wherein the payments are processed by a payment application stored in memory of the smartphone and executed by a processor of the smartphone on different dates;
   determining, by the processor of the smartphone, for each of the payments, an ordered one of the different products, a purchase price for the ordered one of the products and a vendor for the ordered one of the products;
   associating, by the processor of the smartphone, the ordered one of the different products for each of the payments, with corresponding reorder points indicating a lapse of time subsequent to which the ordered one of the different products for each of the payments are to be reordered;
   periodically processing, by the processor of the smartphone, the reorder points to determine whether or not to reorder the ordered one of the different products for each of the payments; and
   in response to the processing, displaying, by the processor of the smartphone, on a display of the smartphone, a reminder to reorder each of the ordered one of the products from the vendor for each ordered product for each of the payments for which the reorder points indicate reordering, wherein the reminder further comprises a list, for each ordered product requiring reordering, of vendors from which the ordered product had previously been ordered by the payment application and all prices previously paid for the ordered product by the payment application.

2. The method of claim 1, wherein the reorder point for each ordered product is computed based upon a lapse in time between monitored payments for the ordered product.

3. The method of claim 2, wherein the lapse in time between monitored payments is an average of all lapses of time between monitored payments for the ordered product over a pre-determined period of time.

4. The method of claim 1, wherein each ordered product is classified according to type and the reorder point is determined for an ordered product based upon a pre-determined reorder point for a type of the ordered product.

5. A smartphone embedded data processing system configured for purchase reminding, the system comprising:
   a smartphone comprising at least one processor, fixed storage, a display, touchscreen input, cellular communications circuitry, and memory;
   a payment processing application disposed in the fixed storage and executed by a processor for processing payments for different ordered products from respectively different vendors on different dates in a plurality of different applications of the smartphone; and,
   a purchase reminding module coupled to the payment processing application and executing by a processor of the smartphone, the module comprising program code enabled to monitor the payments processed by the payment processing application of the smartphone to different vendors for different products in a plurality of different applications of the smartphone, to determine for each of the payments, an ordered one of the different products, a purchase price for the ordered one of the products and a vendor for the ordered one of the products, to associate the ordered one of the different products for each of the payments, corresponding reorder points indicating a lapse of time subsequent to which the ordered one of the different products for each of the payments are to be reordered, to periodically process the reorder points to determine whether or not to reorder the ordered one of the different products for each of the payments and, in response to the processing, to display, on a display of the smartphone, a reminder to reorder each of the ordered one of the products from the vendor for each ordered product for each of the payments for which the reorder points indicate reordering, wherein the reminder further comprises a list, for each ordered product requiring reordering, of vendors from which the ordered product had previously been ordered by the payment application and all prices previously paid for the ordered product by the payment application.

6. The system of claim 5, wherein the reorder point for each ordered product is computed based upon a lapse in time between monitored payments for the ordered product.

7. The system of claim 6, wherein the lapse in time between monitored payments is an average of all lapses of time between monitored payments for the ordered product over a pre-determined period of time.

8. The system of claim 5, wherein each ordered product is classified according to type and the reorder point is determined for an ordered product based upon a pre-determined reorder point for a type of the ordered product.

9. A computer program product for purchase reminding, the computer program product comprising a computer readable storage medium having program instructions embodied therewith, the program instructions executable by a device to cause the device to perform a method comprising:
   monitoring by a payment reminder application of a smartphone, payments processed by the smartphone to different vendors for different products in a plurality of different applications of the smartphone wherein the payments are processed by a payment application stored in memory of the smartphone and executed by a processor of the smartphone on different dates;
   determining, by the processor of the smartphone, for each of the payments, an ordered one of the different products, a purchase price for the ordered one of the products and a vendor for the ordered one of the products;
   associating, by the processor of the smartphone, the ordered one of the different products for each of the payments, with corresponding reorder points indicating a lapse of time subsequent to which the ordered one of the different products for each of the payments are to be reordered;

periodically processing, by the processor of the smartphone, the reorder points to determine whether or not to reorder the ordered one of the different products for each of the payments; and in response to the processing, displaying, by the processor of the smartphone, on a display of the smartphone, a reminder to reorder each of the ordered one of the products from the vendor for each ordered product for each of the payments for which the reorder points indicates reordering, wherein the reminder further comprises a list, for each ordered product requiring reordering, of vendors from which the ordered product had previously been ordered by the payment application and all prices previously paid for the ordered product by the payment application.

10. The computer program product of claim 9, wherein the reorder point for each ordered product is computed based upon a lapse in time between monitored payments for the ordered product.

11. The computer program product of claim 10, wherein the lapse in time between monitored payments is an average of all lapses of time between monitored payments for the ordered product over a pre-determined period of time.

12. The computer program product of claim 9, wherein each ordered product is classified according to type and the reorder point is determined for an ordered product based upon a pre-determined reorder point for a type of the ordered product.

* * * * *